Patented Sept. 5, 1922.

1,428,259

UNITED STATES PATENT OFFICE.

FRIEDRICH RÜSBERG, OF MANNHEIM, GERMANY, ASSIGNOR TO THE FIRM OF RHENANIA VEREIN CHEMISCHER FABRIKEN AKTIEN-GESELLSCHAFT, ZWEIG-NIEDERLASSUNG MANNHEIM, OF MANNHEIM-WOHLGELEGEN, GERMANY, A CORPORATION OF GERMANY.

PROCESS FOR RENDERING CRUDE PHOSPHATES SOLUBLE.

No Drawing. Application filed January 25, 1922. Serial No. 531,744.

*To all whom it may concern:*

Be it known that I, FRIEDRICH RÜSBERG, a citizen of the German Republic, residing at Mannheim, Germany, have invented certain new and useful Improvements in Processes for Rendering Crude Phosphates Soluble, of which the following is a specification.

It has already been proposed for processes of rendering crude phosphates soluble to effect the reaction by means of hydrochloric acid and it has been further proposed to transform the calcium chloride which is produced into gypsum with the aid of alkaline sulphate.

Experiments made by the applicant with a view to render crude phosphates soluble by means of hydrochloric acid gas have shown that in this manner only a very incomplete dissolving is produced.

It has however been found that the process of rendering crude phosphates soluble by means of hydrochloric acid gas is influenced very favourably in regard to rapidity and results if care is taken that sufficient quantities of water are present.

For carrying out the process the procedure can be for instance as follows:—

The preferably finely ground crude phosphate or a mixture of the same with alkali-metal sulphate, for instance potassium sulphate, is treated with hydrochloric acid gas and finely distributed water, for instance in the form of water-vapour or of a spray. One can proceed for instance in such a manner that to a mixture of crude phosphate and alkali-metal sulfate is added water, either in its natural state or in the form of steam in such quantity as to retain the mixture in its powdery state, and then treating the mixture with the hydrochloric gas. It is however preferable to admit the required quantity of moisture continuously during the action of the hydrochloric acid gas either as vapour or as mist.

The addition of such loosening agents which are capable of absorbing and retaining or carrying comparatively large quantities of water without changing their powdery state has proved advisable. If such loosening substances are used the required moisture can be added to these substances either before they are admixed with the ground phosphate or with the mixture of phosphate and alkaline sulphate or all the solid substances can be mixed together and the required moisture can be added to the mixture before the same is exposed to the action of the hydrochloric acid gas. Owing to the presence of the water-binding or water-absorbing loosening substance the total quantity of water required can be added in this case without causing the material of the mixture to give up its powdery state. Infusorial earth and similar substances have proved to be suitable loosening substances. Instead of using dry loosening substances which consequently require to be moistened, such substances, as for instance raw lignite and similar substances, containing naturally greater quantities of moisture in a bound state can be used.

*Example No. 1.*

500 grams of curacao phosphate, 400 grams of ammonium sulphate and 300 grams of infusorial earth are mixed together and the mixture is moistened with as much water as is admissible to retain its powdery state. The moist mixture is then exposed to the action of hydrochloric acid gas. The powdery product contains 12.21% phosphorous acid soluble in water, 12.50% phosphorous acid soluble in citrate and 12.90% total phosphorous acid.

*Example No. 2.*

500 grams of curacao phosphate, 400 grams of potassium sulphate and 200 grams of powdered raw lignite are mixed and the mixture is exposed to the action of hydrochloric acid gas. The powdery end product contains 11.71% phosphorous acid soluble in water, 11.99% phosphorous acid soluble in citrate and 12.06% total phosphorous acid.

Instead of adding the alkali-metal sulphate directly to the crude phosphates before starting the reaction the product obtained by the action of the hydrochloric gas on the moistened crude phosphate may be mixed with more or less great quantities of alkali-metal sulphates in order to transform the highly hygroscopic calcium chloride into gypsum. In such cases it has shown to be advantageous to add to the crude phosphate to be rendered soluble, besides the water-containing or water-binding loosening substance, certain quantities of indifferent distributing substances, for instance, sand, ground gypsum or dry lignite or the like, or mixtures of different distributing substances, in order to prevent the reaction mass from caking together. In operating the process in this manner almost all phosphorous acid is obtained in the form soluble in water.

Example No. 3.

100 kilograms of Florida phosphate are mixed with 40 kilograms pulverized crude lignite and with 50 kilograms of sand and the mixture is submitted to the action of hydrochloric acid gas. The product of reaction contains 14.0% of phosphorous acid soluble in water and 14.9% of total phosphorous acid. By admixing to the product of reaction 80 kilograms of ammonium sulphate a fertilizer is obtained which contains about 12% of phosphorous acid soluble in water and 5% nitrogen.

In carrying out the process by working with hydrochloric acid gas it has finally shown to be advisable to stir the reaction material. With this object in view the process can be carried out for instance in revolving drums or in shaking apparatuses or in any other type of apparatus which will admit of stirring or moving the material. By using the type of apparatus employed for the absorption of dilute chlorine gases produced, for example, by the Deacon process. two advantages are gained, namely: (1) That even dilute hydrochloric acid gas can be used in the process, and (2) that the process can be operated continuously.

By the term alkali-metal sulphates I intend to include sulphates of the alkali metals, potassium, etc., and ammonium sulphate.

I claim:—

1. An improved process for rendering crude phosphates soluble, said process consisting in mixing the crude phosphate with an alkali-metal sulphate, adding continuously as much water to the mixture as is advisable to retain the powdery state of said mixture and acting on the wet mixture with gaseous hydrochloric acid.

2. An improved process for rendering crude phosphates soluble, said process consisting in mixing the crude phosphate with an alkali-metal sulphate, adding to aforesaid mixture a substance capable of acting as a loosening agent and as water carrier, adding continuously as much water to the mixture as is advisable to retain the powdery state of mixture and acting on the wet mixture with gaseous hydrochloric acid.

3. An improved process for rendering crude phosphates soluble, said process consisting in mixing the crude phosphate with an ammonium sulphate, adding continuously as much water to the mixture as is advisable to retain the powdery state of said mixture and acting on the wet mixture with gaseous hydrochloric acid.

4. An improved process for rendering crude phosphates soluble, said process consisting in mixing the crude phosphate with an alkali-metal sulphate, adding to aforesaid mixture a powdered lignite capable of acting as a loosening agent and as water carrier, adding continuously as much water to the mixture as is advisable to retain the powdery state of mixture and acting on the wet mixture with gaseous hydrochloric acid.

5. An improved process for rendering crude phosphates soluble, said process consisting in mixing the crude phosphate with an ammonium sulphate adding to aforesaid mixture powdered lignite capable of acting as a loosening agent and as water carrier, adding continuously as much water to the mixture as is advisable to retain the powdery state of the mixture and acting on the wet mixture with gaseous hydrochloric acid.

6. The process of rendering crude phosphates soluble by acting upon a mixture of crude phosphates and an alkali-metal sulphate with gaseous hydrochloric acid, said process comprising adding as much water to aforesaid mixture as is advisable to retain the powdery state of said mixture.

7. The process of rendering crude phosphate soluble by acting upon a mixture of crude phosphates and an ammonium sulphate with gaseous hydrochloric acid, said process comprising adding as much water to aforesaid mixture as is advisable to retain the powdery state of said mixture.

8. The process of rendering crude phosphates soluble, by acting upon a mixture of crude phosphates and an alkali-metal sulphate with gaseous hydrochloric acid, said process comprising adding a substance capable of absorbing continuously added water without causing the aforesaid mixture to give up its powdery state.

9. The process of rendering crude phosphates soluble by acting upon a mixture of crude phosphates and an alkali-metal sulphate with gaseous hydrochloric acid, said process comprising adding powdered lignite to aforesaid mixture and continuously adding as much water to the mixture as is advisable to retain the powdery state of the mixture.

10. The process of rendering crude phosphates soluble by acting upon a mixture of crude phosphates and ammonium sulphate with gaseous hydrochloric acid, said process comprising adding powdered lignite to aforesaid mixture and continuously adding as much water to the mixture as is advisable to retain the powdery state of the mixture.

In testimony whereof I have signed my name to this specification in the presence of two subscribing witnesses.

FRIEDRICH RÜSBERG.

Witnesses:
 Thos. H. Anderson,
 H. R. Sommerhoff.